United States Patent [19]

Dinverno

[11] Patent Number: 5,183,372
[45] Date of Patent: Feb. 2, 1993

[54] VAN-MOUNTED SERVICE CARTS FOR SKILLED TRADESMEN

[76] Inventor: Daniel Dinverno, 7511 Intervale, Detroit, Mich. 48238-2401

[21] Appl. No.: 654,213

[22] Filed: Feb. 12, 1991

[51] Int. Cl.$^5$ ............................................. B60P 1/00
[52] U.S. Cl. .................................. 414/538; 280/47.35; 424/537; 211/60.1; 248/339; 14/71.1
[58] Field of Search .................... 280/47.35, 79.3; 414/537, 538; 224/42.45 R; 248/339; 211/60.1; 14/71.1

[56] References Cited

U.S. PATENT DOCUMENTS

| | | |
|---|---|---|
| 1,660,521 | 2/1928 | Nordgren . |
| 2,188,374 | 1/1940 | Sanchez . |
| 2,201,533 | 5/1940 | Goldman ............................ 280/50 |
| 2,583,196 | 1/1952 | Zander et al. ..................... 280/59 |
| 2,784,999 | 3/1957 | Hunt ............................ 280/47.35 |
| 2,981,549 | 4/1961 | Hotton .......................... 280/47.35 |
| 3,313,378 | 4/1967 | Freeman et al. ................... 188/21 |
| 3,445,150 | 5/1969 | Zartarian ................... 280/47.35 X |
| 3,524,412 | 8/1970 | Wilson ........................ 414/537 X |
| 3,874,531 | 4/1975 | Mayo ....................... 280/47.35 X |
| 4,005,873 | 1/1977 | Jacobsen et al. .................. 280/63 |
| 4,078,678 | 3/1978 | Tordella .......................... 414/537 |
| 4,221,536 | 9/1980 | McFee ............................ 414/786 |
| 4,542,909 | 9/1985 | Littwin et al. .................. 280/79.1 |
| 4,652,062 | 3/1987 | Greenwood ...................... 312/209 |
| 4,923,103 | 5/1990 | Sauber ...................... 224/42.45 R |
| 4,989,291 | 2/1991 | Parent ...................... 280/47.35 X |
| 5,020,960 | 6/1991 | Provenson ................... 414/538 X |

FOREIGN PATENT DOCUMENTS 200224 11/1965 Sweden ......................... 280/47.35

*Primary Examiner*—Frank E. Werner
*Attorney, Agent, or Firm*—Basile and Hanlon

[57] ABSTRACT

A service cart transportable in a van or truck is comprised of a vertically oriented pyramid-shaped profile. The pyramid shape offers a high degree of stability, making it virtually impossible to tip over during normal operating conditions, especially during transport. The cart has a fourwheel base. One set of wheels is preferably swivel casters for turning sharp corners. A second set of wheels is larger and located externally of the cart. These wheels increase the base of the pyramid profile and add to the cart's stability. The service cart may be transported to and from a job site. The cart fits into a van or truck bed. To remove the cart from the vehicle, a ramp system is provided. A mechanical or electrical winch may be used to transport the cart into or out of the vehicle.

9 Claims, 4 Drawing Sheets

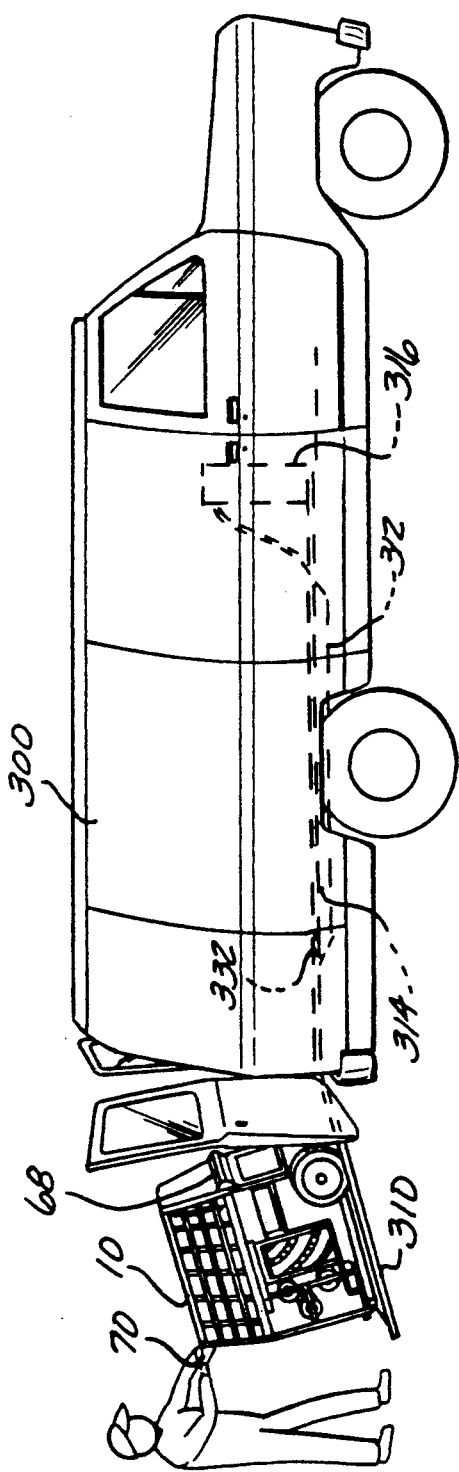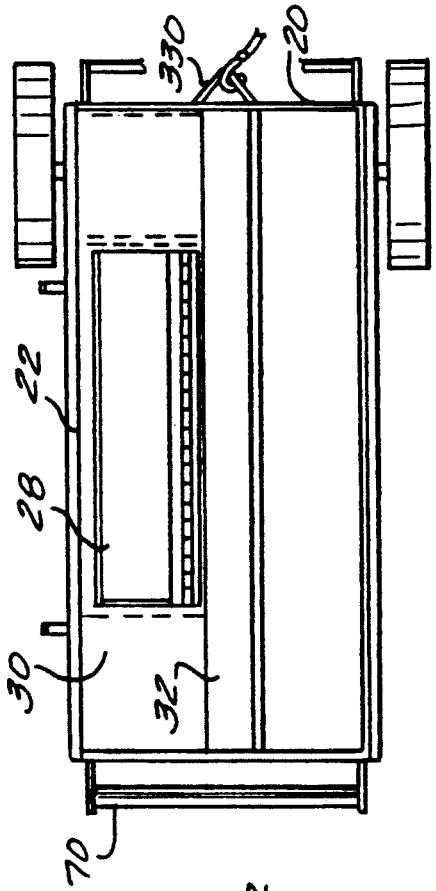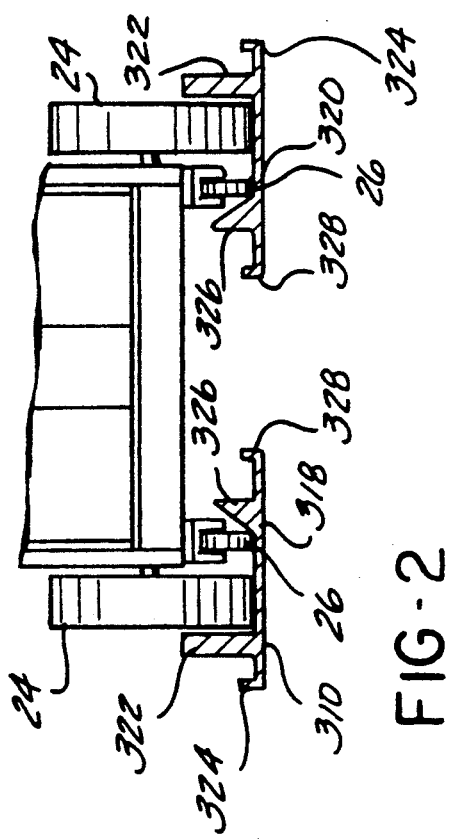

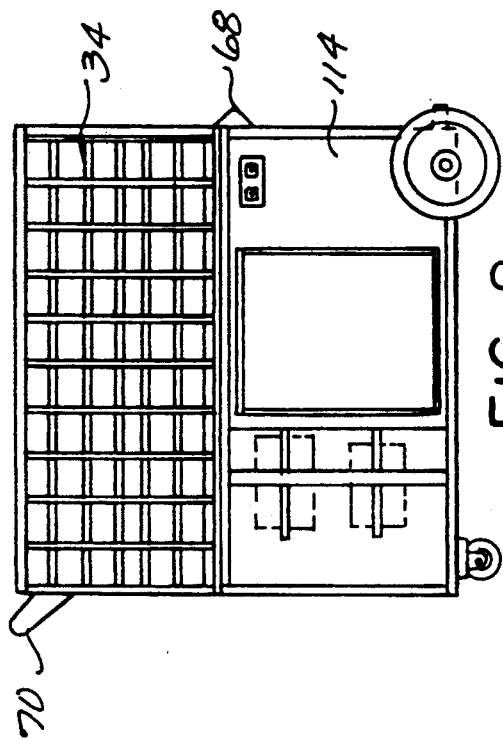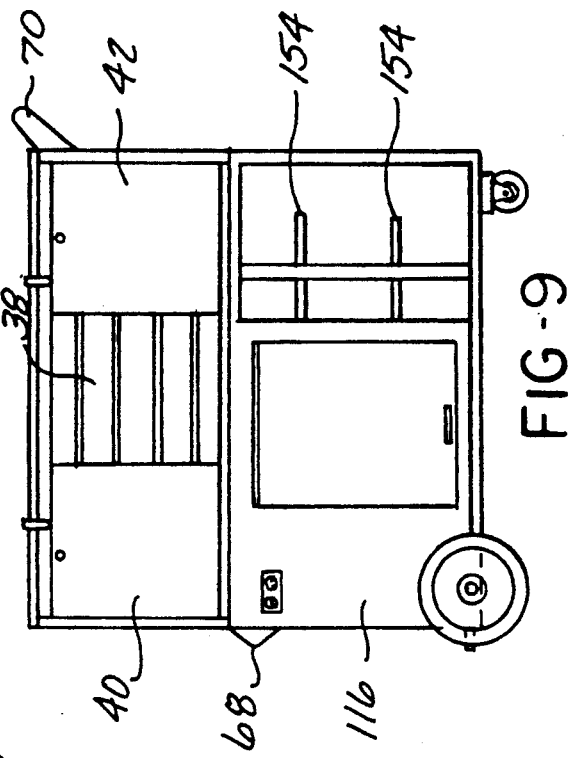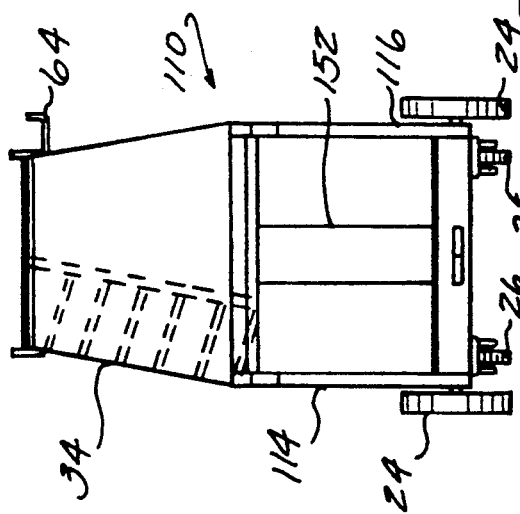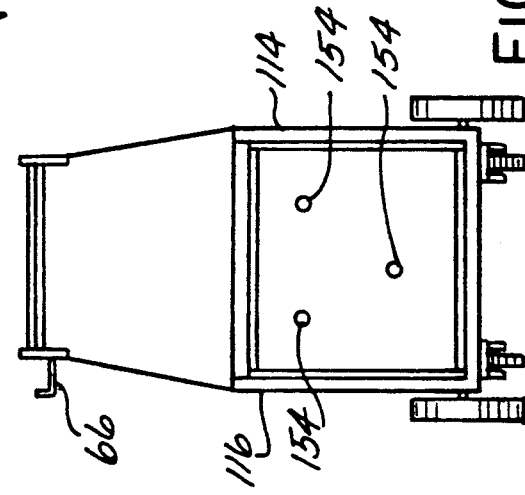

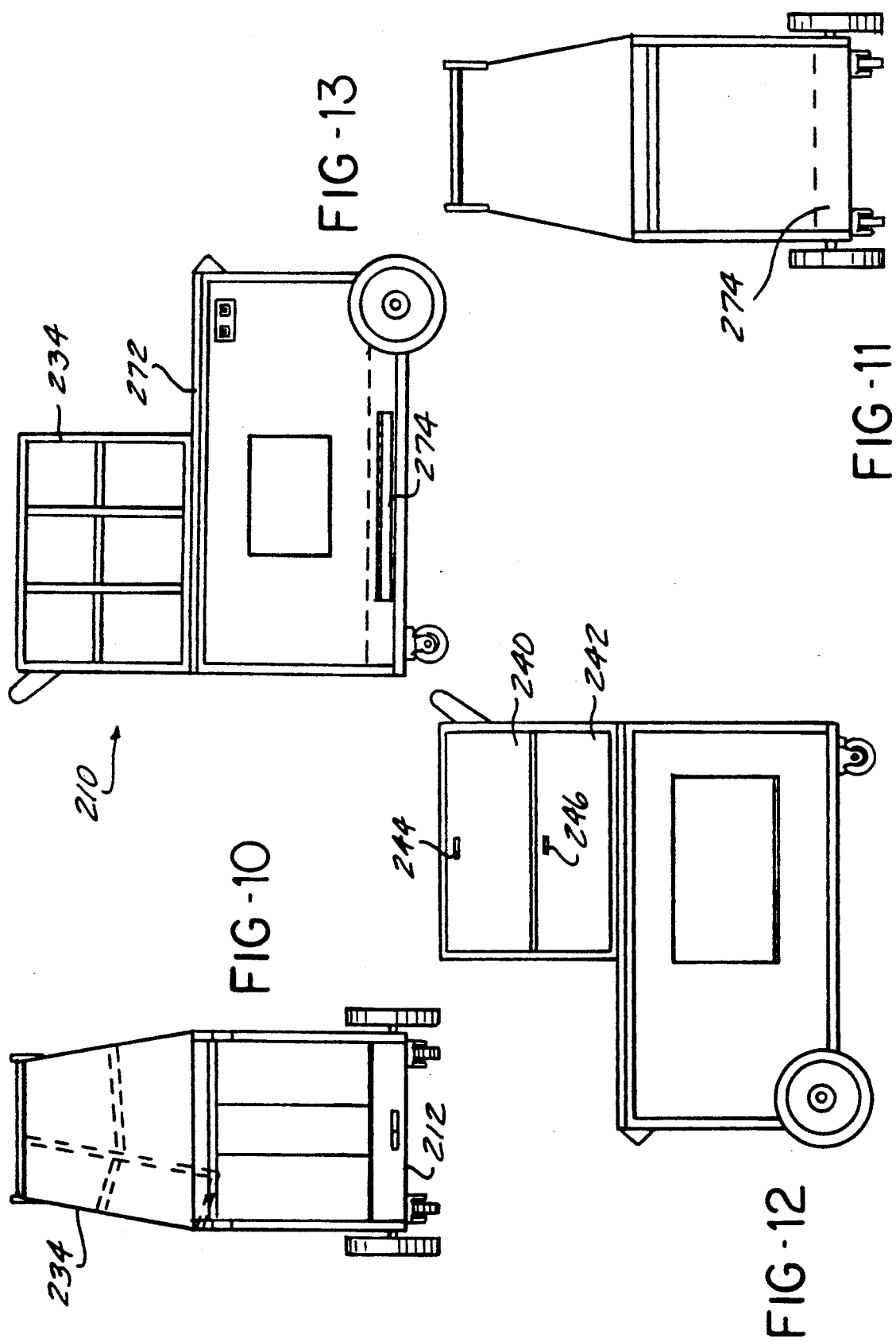

VAN-MOUNTED SERVICE CARTS FOR SKILLED TRADESMEN

BACKGROUND OF THE INVENTION

I. Field of the Invention

The present invention relates to service carts for skilled tradesmen. More particularly, the present invention relates to service carts that are transportable in a van or truck to be used as a mobile storage unit on a job site.

II. Description of the Prior Art

At present, the efficiency of mobile skilled trade and service personnel has been severely hampered due to problems associated with the transportation of essential tools and materials from the van or service vehicle to the point at the job site where they are needed. Most contractors or tradesmen have shelving or drawer units within or about their vehicles to organize their tools and materials. The shelving on the vehicles allows the tradesmen to transport their tools to the job site. However, once at the job site, the tradesmen must physically carry the tools from the vehicle to the actual working area.

The task of transporting the needed equipment and tools to the work site can be laborious, time-consuming and an inefficient process since it usually entails many trips back and forth to the service vehicle. As a result, the tools and equipment may be deposited in a haphazard manner over an area of floor space on the job site. This may result in the misplacement or loss of several tools.

As the work progresses during the day, additional trips back and forth to the service vehicle may be required as unexpected tools or materials may be needed to complete a job. At the end of the workday, the entire tool unloading process must be reversed. This process consumes several valuable hours of a skilled tradesman's day for which he may be working or traveling home.

Several service carts are available on the market at the present time to assist in solving this material-handling problem. One such service cart is described in U.S. Pat. No. 2,981,549 to Hotton. This mobile tool stand is comprised of a multi-drawer rectangular housing with a four-wheeled base. A handle extends from the upper end of the housing for transporting the cart. Another common service cart available on the market is comprised of single or multi-tiered storage areas with two fixed and two swivel casters for moving the unit about the work area. These types of service carts are designed solely for "in-house" use. The structure of these carts is unsuitable for transportation over rough, unlevel parking areas. Further, the profile of these carts and their corresponding wheel bases will not structurally support travel within a vehicle at higher rates of speed without tipping or spilling the stored tools.

Another type of mobile service container presently available for use by tradesmen is commonly known as a "gang box." This is a container formed of a heavy steel enclosure that provides a single internal common storage area. The gang box is not equipped with a wheel base, therefore, it is used specifically for jobs of long duration and stored at the job site.

A disadvantage of these previously known service carts and containers is the inability to transport the carts from the tradesman's garage or storage area into his vehicle and then to the job site. A further disadvantage of the service carts is their unstable profile which prevents them from being transported across rough surface areas, such as those typically found on a job site, without tipping or spilling tools or equipment.

SUMMARY OF THE INVENTION

The present invention provides a service cart which overcomes the disadvantages of the previously known service carts.

The service cart of the present invention is formed of a housing having a vertically oriented pyramid shape. This profile offers a high degree of stability and resistance, making it virtually impossible to tip over, especially during transportation to or from a job site.

The service cart of the present invention generally comprises multiple storage areas for holding and storing equipment needed by a tradesman to perform his job. These storage areas conform to the pyramid profile of the cart thus offering ease of access to these areas since entry is gained through a tapered aperture rather than a perpendicular entry.

The service cart has one or more pairs of fixed or retractable hangers extending at right angles from the tapered plane of the cart's side. These hangers are suitable for use in transporting a ladder or any other long narrow object, such as a bundle of conduit. As the hangers are perpendicular to the tapered sides of the cart, they create an acute angle with the base of the cart. This creates a more secure storage area as the acute angle prevents the equipment from sliding off the hangers.

An opposing set of wheels extends from the base of the cart. One set of wheels is comprised of offset swivel casters. This allows the cart to be turned around sharp corners. The opposing set of wheels are larger and located externally of the cart. These larger wheels contribute to the stabilization of the cart as they widen the overall base of the pyramid shape. Further, these larger wheels act as a bumper, preventing the cart from damaging interior walls as the obstructions will strike the protruding wheels before the cart itself.

The cart may be created with specific embodiments to accommodate certain specialized trades. In this regard, special carts are made available for electricians, plumbers, finish carpenters, etc.. Each cart is comprised of the general embodiments described above and further includes special storage areas to accommodate the special tools required with each trade.

Specifically, the electrician's cart is provided with dowel-like pins extending the width of the cart for storing electrical wire. A storage space is provided for storing a conduit bender. A work service area extends the length of the cart for accessing more regularly used tools and equipment.

The plumber's cart, like the electrician's cart, is provided with dowel-like pins which extend parallel with the sides of the cart for storing coiled copper or flexible plastic tubing. Further, a storage area is provided for storing an acetylene tank, including a hose and gauge.

Finally, the carpenter's cart is provided with a flat surface for mounting large equipment, such as a miter saw, which may be needed for use on the job site. A storage area is also provided for storing an air compressor and its corresponding hoses. This cart is narrower in its overall width than the plumber's or electrician's cart to accommodate narrow hallways and tight corners in homes.

To transport the carts in and out of a vehicle, a ramp system, stored within the vehicle, is preferred. The ramp is preferably stored in a housing secured to the floor of the vehicle which defines a drawer-like space extending immediately above the floorboard of the vehicle having dimensions suitable to accommodate the ramp when stored. An electrical or mechanical winch may also be installed at the front end of the truck bed or van to winch the service cart onto the floor of the vehicle. A hook is provided at the base of the cart for attachment to the winch.

To transport the service cart in or out of a vehicle, the ramp is withdrawn from the drawer area to the exterior of the vehicle. A stop or trip dog is provided on the end of the ramp to prevent the tradesman from pulling the ramp completely out of the storage drawer area. The winch is hooked to the front of the service cart and activated to lower or lift the cart along the ramp. In the preferred embodiment, one cart is transported into or out of the vehicle at a time. However, it is within the purview of this invention to modify the mechanism to permit several carts to be transported into or out of the vehicle at one time. This could be accomplished by aligning the carts piggyback. In such instances, the winch could be drawn underneath the forward carts and hooked to the outermost cart. In this way, the outermost cart supports the line of movement of the foremost carts up or down the ramp.

The ramp system is comprised of two separate ramps each having a profile to accommodate the rotation of the two types of wheels provided with the service cart. Each ramp has a rectangular extrusion at its outermost edge to accompany the rotation of the larger front wheels. A triangular extrusion is provided inward of the rectangular extrusion to accommodate the rotation of the swivel casters.

Each of the above carts may also be equipped with a handle, preferably collapsible, for ease of movement of the cart by the tradesman. Further, the cart may be provided with electrical sockets for plugging in power tools. Finally, some or all of the storage areas provided in the cart are lockable to allow storage of more expensive power tools needed by the trades and prevent pilfering of the hardware contained within the cart if it is to be left unattended.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the view, and in which:

FIG. 1 is a perspective view illustrating a preferred embodiment of the present invention being transported from a vehicle;

FIG. 2 is an end view of a profile of the preferred embodiment of the ramp used in transporting the present invention;

FIG. 3 is a top elevation al view illustrating a preferred embodiment of the present invention;

FIG. 6 is a front elevational view of a second preferred embodiment of the present invention;

FIG. 7 is a rear elevational view of FIG. 6;

FIG. 8 is a right side elevational view of FIG. 6;

FIG. 9 is a left side elevational view of FIG. 6;

FIG. 10 is a front elevational view of a third preferred embodiment of the present invention;

FIG. 11 is a rear elevational view of FIG. 10;

FIG. 12 is a right side elevational view of FIG. 10; and

FIG. 13 is a left side elevational view of FIG. 10.

DETAILED DESCRIPTION OF THE PREFERRED EMBODIMENTS

Figure 4:
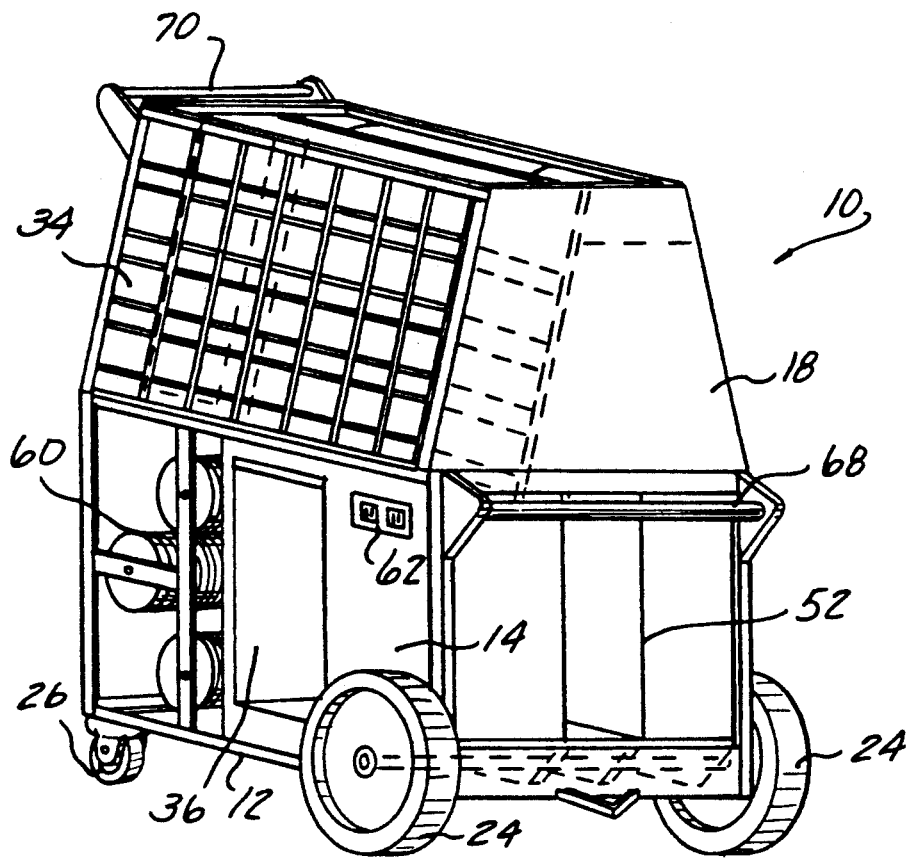
FIG. 4 is a front elevational view illustrating a first preferred embodiment of the present invention.
Figure 5:
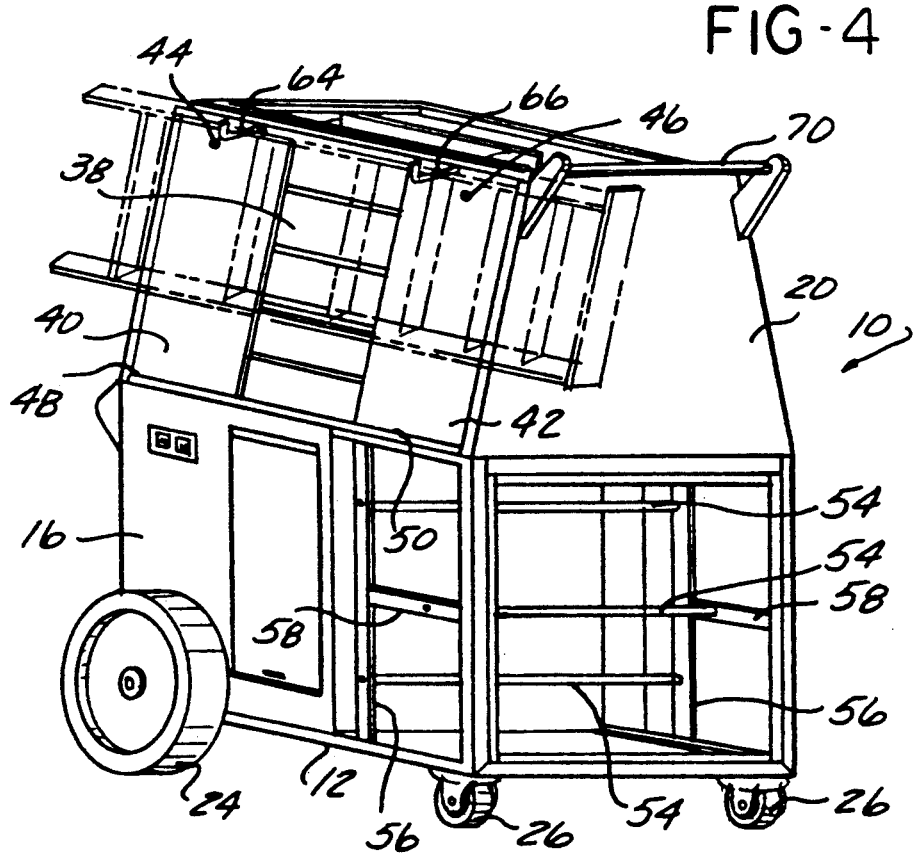
FIG. 5 is a rear elevational view of FIG. 4.

With reference first to FIGS. 4 and 5, a first preferred embodiment of the service cart 10 of the present invention is there shown.

The first preferred embodiment is equipped with storage areas specifically sized for an electrician's tools and equipment. The cart 10 comprises a rectangular base 12. Opposing side panels 14, 16 extend upwardly from base 12. Vertically oriented pyramid-shaped end members 18, 20 extend perpendicular to side panels 14, 16 and create the overall pyramid profile of the service cart 10.

Top 22 (FIG. 3) extends between end members 18, 20, and closes the service cart 10 into a unitary structure. Service cart 10 has opposing sets of wheels 24, 26 extending from base 12. Wheels 24 are large and seated outwardly from side panels 14, 16 creating a larger base area for the pyramid profile of the service cart 10. Smaller wheels 26 are preferably swivel casters for turning the service cart 10 about a small radius.

Multiple storage areas are provided within the cart 10. With reference to FIG. 3, a top view is there shown of the preferred embodiment used for all embodiments of the service cart 10. Specifically, a hinge top 28 provides access to a lockable storage area 30 in top 22. A flat work surface 32 is also provided for storing meters or other small items which are commonly used. The top 22 may also be reinforced for permanently mounting equipment such as vices that may be used on the service cart 10 at the job site.

With reference now to FIGS. 4 and 5, a plurality of bins 34, preferably sixty-six (66) in number, are provided to store fittings of small to medium size. Below bins 34 is a lockable storage area 36 for storing power tools such as a drill, saw or drive pin fastening gun. Opposite the bins 34 is a drawer storage cabinet 38, preferably comprised of a plurality of drawers, preferably 56 in number. This cabinet 38 is provided for storing equipment such as fasteners. Should additional or alternate fastener storage space be required, additional drawers can be positioned in the front face 18 (not shown). In either side of the cabinet 38 are bins 40, 42 for storing other equipment. The bins are provided with locks 44, 46. The tops of the bins swivel downward from hinges 48, 50 allowing ease of access into the storage area due to the pyramid profile of the service cart 10.

With reference now to FIG. 4, an open storage area is there shown at 52. This area is provided for storing conduit benders. The storage area 52 preferably extends the length of the service cart 10. Where additional fastener storage drawers are provided in this region, it is understood that this open storage area 52 will be shortened or modified.

With reference now to FIG. 5, a plurality of dowel-like pins 54 extend between vertical and horizontal partitions 56, 58 which are supported by side panels 14, 16. Pins 54 are provided to store electrical wiring 60. The wiring 60 can be drawn from the cart 10 whenever needed by the tradesman. Service cart 10 is also provided with an electrical outlet 62 for connecting power tools to a remote electrical source.

A plurality of retractable fingers 64, 66 extend perpendicular to the tapered profile of side panel 16. Fingers 64, 66 provide support for hanging tools, such as ladders or bundles of conduit. The acute angle of the fingers 64, 66 to the base 12 of the service cart 10 prevents the supported equipment from rolling off the end of the fingers 64, 66. A plurality of handles 68, 70 are provided on either end 18, 20 of the cart 10 to push or pull the cart as necessary.

With reference now to FIGS. 6 through 9, a second preferred embodiment is there shown for transporting equipment for a plumber. The cart 110 is essentially similar to the electrician's cart shown in FIGS. 4 and 5 with some modifications to accommodate specific plumbing equipment. Specifically, open storage area 152 is capable of storing a forty (40) cubic foot acetylene tank with accompanying hose, tip and gauge. Dowel-like pins 154 extend parallel with side panels 114, 116 from partition 172. Pins 154 can be used to store coiled copper or flexible plastic tubing. Alternately, the dowel-like pins 154 can be replaced by a plurality of vertical dividers (not shown) which extend from the base 112 to the upper surface of the opening. The dividers can be positioned in such a manner as to define a plurality of narrow storage spaces to accept copper coils and wider spaces to accept acetylene tanks. It is to be understood that such spaces can be equipped with suitable clamps or holders to secure the devices in the associated openings.

In this embodiment, the drawers 38 can be replaced by a plurality of smaller parts drawers or a combination of parts drawers and storage spaces for small parts (not shown). If desired, the top can be recessed to permit temporary storage and can be reinforced with a suitable vice mounting plate to permit addition of vice grips (not shown). The cart 110 can also optionally be outfitted with a suitable tool holder (not shown) for storing and carrying a plurality of power tools adjacent to the drawers 38.

With reference now to FIGS. 10 through 13, a third preferred embodiment is there shown for transporting finished carpentry tools. Carpenter's cart 210 is provided with all the amenities described in the electrician's cart 10 above. The carpenter's service cart 210 is preferably provided with a narrower overall base 212 to enable the cart 210 to be transported around corners in houses and down narrow hallways without damaging walls. Bins 234 are preferably larger to accommodate small power tools such as air gun nailers and cordless drills. It is to be understood that the size and orientation of the bins 234 can be altered as necessary to accommodate tool storage. Drawers 240, 242 are provided opposite bins 234 to store additional hand and power tools. Drawers 240, 242 and bins 234, preferably, have locks to provide permanent storage of these tools. Opposite the drawer and bin area of the service cart 210 is a flat mounting base 272 for permanently mounting large power tools such as a miter saw. Base 272 provides enough open area for actual use of the saw or other power tool from the service cart 210. This surface may optionally be hinged to permit access to the storage area located immediately below in which an air compressor or the like can be stored. If desired, a pneumatic cylinder can be attached to the base 272 to aid lifting.

The base portion of the device can be modified from that shown in FIG. 13 to include a plurality of large storage bins and drawers immediately below bins 234 to accommodate nails, fasteners, etc.

All three embodiments of the service cart may also be provided with a lockable storage area 274 in the base 212 of the service cart 210.

With reference now to FIGS. 1 through 3, a preferred embodiment of means for transporting the cart into and out of a vehicle is there shown.

With reference first to FIG. 1, van 300 is there shown with a service cart 10 being transported out of the van 300. A ramp 310 is stored in the base 312 of the van 300 inside a drawer area 314. The drawer area 314 is attached to the floor 312 of the van 300 and forms a guide on its upper surface onto which the wheels of the cart rest during transport. In this way, the service cart 10 rests on the base 312 of the van 300 and is maintained in position by the upper surface during transportation.

A winch 316 is provided for easier loading or unloading of the service cart 10 from the van 300. The winch 316 may be electrical or mechanical.

With reference now to FIG. 2, a profile of the ramp 310 is there shown. The ramp 310 is comprised of two separate planks 318, 320. Each plank is provided with a rectangular extrusion 322 on its outer edge 324 to accommodate the rotation of the larger wheels 24. A triangular extrusion 326 is provided on the inner edge 328 of planks 318, 320 to accommodate rotation of swivel casters 26.

With reference to FIG. 3, service cart 10 is there shown having a eyelet 330 extending from end 20 for attachment to winch 316.

To transport carts 10 in and out of van 300, which 316 is attached to hook 330 at the front of the cart 10. The winch 316 is activated to draw cart 10 up ramps 310 into the van 300. Ramps 310 are then slide into the drawer area 314 and stored permanently until further use. The service carts 10 may be piggybacked into and out of the van 300 if several are used at once. To accommodate this, the winch 316 is drawn underneath the foremost cart and hooked to the outermost cart. The outermost cart 10 then leads the trail of carts down the ramp area. If the carts are to be drawn into the van, the outermost cart will then push the foremost carts up the ramp into the van.

The ramp 30 is provided with trip dogs or stops 332 to prevent the tradesman from removing the blanks 318.320 completely from the drawer area 314. Handles 68, 70 are provided for the tradesman to transport the cart about the job site.

Having described my invention, however, many modifications thereto will become apparent to those skilled in the art to which it pertains without deviation from the spirit of the invention as defined by the scope of the appended claims.

I claim:

1. In a motor vehicle having an enclose cargo storage area with a floor, the improvement comprising:
   a removable service cart for transporting tools, the service cart including tool storage means for storing tools and equipment within the service cart and wheel means connected to the service cart for moving the service cart across generally planar surfaces, the wheel means having at least one fixed axis of rotation common with respect to two wheels, the tool storage means including a rectangular box-like lower portion of the service cart having an elongated longitudinal axis normal to the one common fixed axis of rotation, the elongated longitudinal axis defining a length of the lower portion greater than a width and a height of the lower portion, and an upper portion of the service cart having at least two sidewalls inclined and upwardly extending toward one another along at least a part of a length of the upper portion of the service cart, such that a top extending between the sidewalls has a width less than the width of the lower portion, the upper portion having a height substantially the same as the height of the lower portion;

retractable ramp means normally stored on the floor of the motor vehicle and extendible beyond the floor for bridging space between the floor and the adjacent ground to allow removal of the service cart by wheeling the service cart across the floor and across the ramp means to the ground; and winch means connected to the motor vehicle within the enclosed storage area and connectible to the service cart for winching the service cart across the ramp means between the ground and the floor of the storage area.

2. The service cart as defined in claim 1 further comprising:

at least two fingers telescopically extending from and retractable into apertures located in the upper portion adjacent to the top for supporting exteriorly mountable tools the fingers each comprising an elongated shaft member movable through a respective apertures, the fingers each having a first end permanently located within the upper portion and a second end exterior thereto and a stop member perpendicularly attached to the second end of the elongated shaft member, the stop member positioned exterior to the upper portion; and said tool and equipment storage means comprising a plurality of storage cubicles adapted to receive the tools to be transported, the storage cubicles accessible from exterior of the service cart through respective associated apertures.

3. The service cart as defined in claim 2 wherein the tool and equipment storage means further comprises:

a plurality of bins positioned in a first storage cubicle located in the upper portion of the service cart;

a large wire containment storage area located in a second storage cubicle located in the lower portion of the service cart, the wire containment storage area including a plurality of dowel-like pins and means for mounting the pins within the storage area in an orientation essentially parallel to a base of the cart; and a plurality of slidable drawers mounted in a third storage cubicle located in the upper portion of the service cart opposed to the first storage cubicle.

4. The service cart as defined in claim 2 wherein the tool and equipment storage means further comprises:

a plurality of bins positioned in a first storage cubicle within the upper portion of the service cart;

a second storage area located in the lower portion of the service cart, said storage area configured to releasably contain gas storage cylinders;

a third storage area opposed to the second storage area, the second storage area defined by side panels in the lower portion and a partition extending perpendicular to the longitudinal axis, the third storage area having a plurality of pins extending outward from the partition.

5. The service cart as defined in claim 2 further comprising:

a plurality of bins located in a first storage cubicle located in the upper portion; and a plurality of slidable drawers mounted in a second storage cubicle in the upper portion, the second cubicle opposed to the first cubicle;

wherein the lower portion has a length greater than the length of the upper portion.

6. The retractable ramp means as defined in claim 1, comprising:

a drawer member attached to the floor of the enclosed cargo area, the drawer member having an upper surface including a guide on which the wheel means of the cart rest during transport, the drawer member defining an interior region extending longitudinally therethrough and accessible by an end opening;

a pair of elongated planks contained in the interior region of the draw member and telescopically extendable therefrom through the end opening to a fully extended position projecting angularly downward from the vehicle cargo floor, the elongated planks each having an upper face, a longitudinal edge and at least one triangular shoulder positioned on the upper face extending longitudinally along the longitudinal edge, the triangular shoulder engageable with a side surface of at least one of the wheels on the service cart relative to the elongated plank; and means for preventing complete removal of the extendable planks from the interior of the drawer member.

7. The winch means as defined in claim 6 comprising:

a winch motor permanently attached to the vehicle cargo floor at a position opposed to the end opening in the drawer member;

a winch cable retractable and extendable relative to the winch motor; and a hook attached to the winch cable releasably engageable with the service cart.

8. The service cart as defined in claim 7 further comprising:

a eyelet integrally mounted to the service cart at a position adjacent to the lower portion, the eyelet being releasably engageable with the winch hook;

a handle member mounted on the service cart adjacent to the upper portion, the handle member comprising a pair of opposed brackets extending outward from the upper portion and a across member attached to the brackets and extending therebetween.

9. The invention as defined in claim 6, wherein the elongated planks each further comprise the rectangular shoulder positioned on the upper face extending longitudinally along an outer edge of the plank opposed and parallel to the triangular shoulder engageable with a side surface of at least one of the wheels on the service cart for guiding and positioning the cart relative to the elongated plank.

* * * * *